April 20, 1954   L. C. BEARER   2,675,999
PEBBLE HEATER REACTOR
Filed Dec. 19, 1952
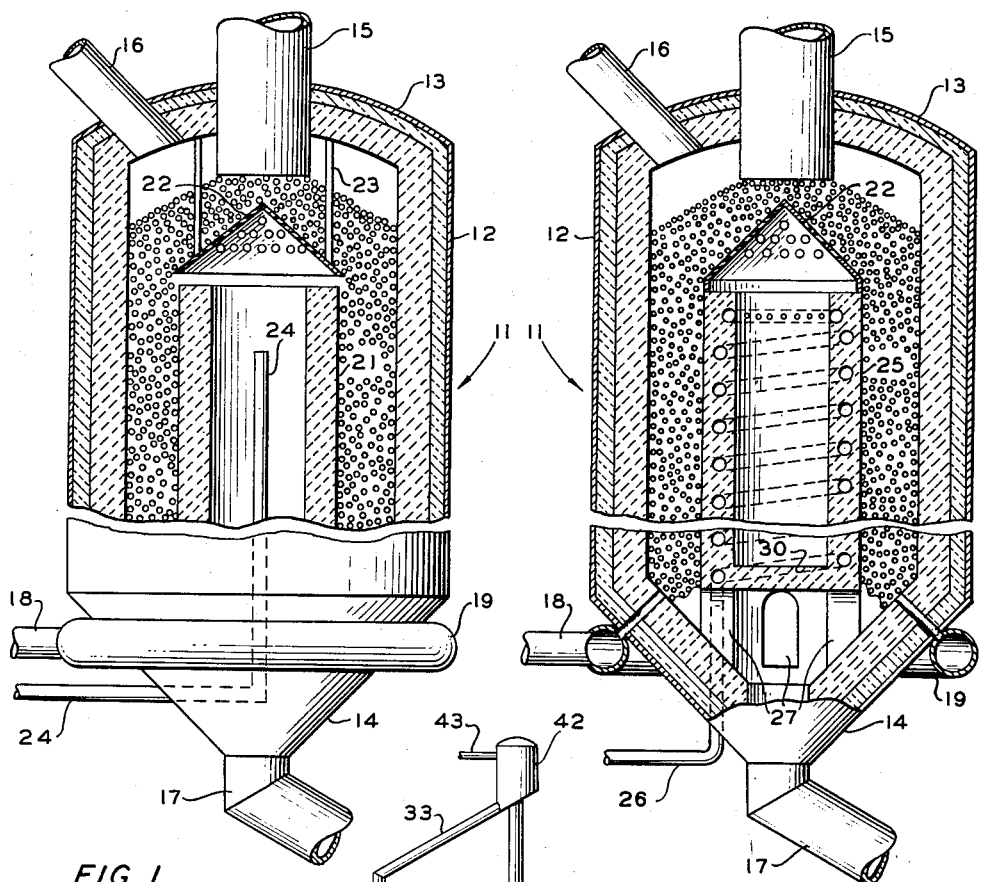
FIG. 1
FIG. 2
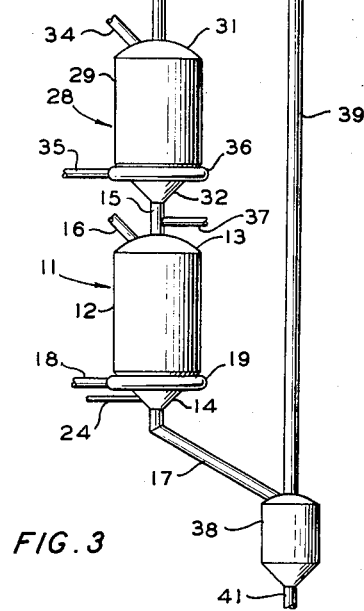
FIG. 3
INVENTOR.
L. C. BEARER
BY Hudson and Young
ATTORNEYS Patented Apr. 20, 1954

2,675,999

UNITED STATES PATENT OFFICE 2,675,999

PEBBLE HEATER REACTOR

Louis C. Bearer, Waco, Tex., assignor to Phillips Petroleum Company, a corporation of Delaware Application December 19, 1952, Serial No. 326,995

6 Claims. (Cl. 257—55)

This invention relates to pebble heat exchangers. In one of its more specific aspects, it relates to pebble heater reactors. In another of its more specific aspects, it relates to means for introducing steam at the top of the pebble heater reactor beneath the pebble inlet so as to prevent the contacting of hydrocarbon gas and the hot pebbles adjacent the pebble inlet.

Heat exchangers of the so-called "pebble heater" type have been utilized in recent years for the purpose of heating fluids to elevated temperatures. Such apparatus is especially suited for use in temperature ranges above those at which the best available high temperature structure alloys fail. Thus, such equipment may be used for superheating steam or other gases and for the pyrolysis of hydrocarbons to produce various products such as ethylene and acetylene, as well as for other reactions and purposes. Conventional pebble heater type apparatus includes two refractory lined contacting chambers disposed one above the other and connected by a refractory lined passageway or pebble throat of relatively narrow cross-section.

Refractory solids of flowable size and form called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to 1 inch in diameter. In a high temperature process, pebbles having a diameter between about ¼ inch to ⅜ inch are preferred. The pebbles must be formed of a refractory material which will stand temperatures at least as high as the highest temperature attained in the pebble heating chamber. The pebbles must also be capable of withstanding temperature changes within the apparatus. Refractory material, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, the pebble inlet temperature in the lower chamber is about 50° F. to about 200° F. below the highest temperature of the pebbles within the upper chamber. In processes for the production of ethylene from light hydrocarbons, such as ethane, propane, or butane, the pebble temperature in the reaction chamber is usually in the range of 1200° F. to 1800° F. For the production of acetylene by pyrolysis of hydrocarbons, temperatures in the range of 1600° F. to 2000° F. are desirable.

In the past, considerable trouble has been encountered in that coke has deposited on the surface of the upper end of the reactor chamber and periodically breaks loose and gravitates through the reactor chamber, often depositing in the pebble outlet conduit or conduits, thereby resulting in the temporary slowing or stoppage of pebble flow through the reactor chamber and hence through the heating chamber. When this occurs the pebbles within the pebble heater chamber tend to become overheated and often fuse together, thereby causing considerable maintenance difficulty. Under almost all operating conditions, a considerable portion of the gaseous reaction products obtained in the pebble heater reactor contact the hot pebbles from the heater chamber adjacent the entrance of those pebbles into the reactor. The gaseous products are overheated in the direct heat exchange and a considerable portion thereof is converted to coke within and on the reaction chamber. I have devised a means whereby the deposition of coke in the upper end of the reactor chamber is materially reduced.

Each of the following objects of the invention is attained by at least one aspect of this invention. An object of this invention is to provide an improved pebble heater apparatus. Another object of the invention is to provide improved means for preventing the choking of pebble conduits or elevator means by large coke aggregates.

Another object of the invention is to provide means for producing steam and introducing that steam into the mass of pebbles adjacent their entrance into the reactor chamber. Other and further objects and advantages will be apparent to those skilled in the art upon study of the accompanying discussion and the drawings.

Broadly speaking, this invention comprises a means and method for producing steam and introducing that steam into the column of pebbles entering the top of the reaction chamber so as to prevent hydrocarbon reaction products from coming into contact with the hot pebbles at that point. A central core is provided in the reaction chamber so as to form an annular pebble bed between the core and the outer shell of the reaction chamber. A water or steam conduit is passed upwardly through the central core and opens at the upper end portion of that core so as to permit the escape of steam from the upper end portion of the core into the hot pebble mass being discharged onto the top central portion of the pebble bed. This blanket of steam prevents the hydrocarbon gases from contacting the hot pebbles beneath the pebble inlet conduit and prevents the overcracking of those hydrocarbon gases in that portion of the pebble bed. The steam which passes upwardly through the upper portion of the top section of the pebble bed, sweeps through the selected portion of the pebble bed at the top of the reactor chamber thereby reducing the extent of contact of the incoming column of hot pebbles and the hydrocarbon reaction products in that section of the pebble mass. The steam and reaction products are removed through a gaseous effluent outlet conduit in the upper end of the reaction chamber. The central core may be provided so as to form the water or steam conduit within its walls, thereby providing means for converting the water to steam or for superheating the steam before introduction thereof into the pebble mass.

Better understanding of this invention will be obtained upon study of the accompanying schematic drawing in which:

Figure 1 is a diagrammatic representation of a reactor chamber of pebble heater apparatus.

Figure 2 is a preferred modification of a reactor chamber of pebble heater apparatus of this invention.

Figure 3 is a schematic view of pebble heater apparatus of this invention.

Referring to particularly Figure 1 of the drawings, reaction chamber 11 comprises elongated shell 12 closed at its upper and lower ends by closure member 13 and 14, respectively. Pebble inlet conduit 15 extends centrally in the upper end portion of that chamber and gaseous effluent outlet conduit 16 extends upwardly from the upper end portion of that chamber. Pebble outlet conduit 17 extends downwardly from the lower end of chamber 11 and reactant material inlet conduit 18 is connected to the lower end portion of chamber 11 through header member 19. A hollow central core 21 is provided within chamber 11 so as to extend upwardly through the lower portion thereof into the upper end portion of that chamber. Perforate baffle 22, which is preferably suspended from the upper end portion of chamber 11 by means of hanger members 23 is positioned directly below and concentrically with pebble inlet conduit 15. Baffle member 22 is positioned close enough to the upper end portion of central core 21 as to prevent pebbles from passing between the two members and into the interior of hollow core 21. Baffle member 22 is preferably perforate only in its upper end portion so as to concentrate the flow of steam through and around the incoming column of pebbles. Core 21 may be supported within chamber 11 in any one of several different manners. Steam conduit 24 extends into the lower end portion of chamber 11 and upwardly to the interior of core 21 to the upper end portion thereof and opens into the interior of the hollow core 21.

Referring particularly to the device shown in Figure 2 of the drawings, parts like those described and discussed in connection with Figure 1 are identified by like numerals. Core 25 extends upwardly from the lower end portion of chamber 11 into the upper end portion of that chamber. Fluid conduit 26 extends into the lower end portion of chamber 11 through the support for core 25 and passes helically upwardly through the wall of core 25 to the upper end portion of that core. A plurality of perforations into the interior of core 25 at its upper end communicates between the upper end portion of conduit 26 and the interior of core 25. Core 25 is provided with a closure member 30 in its lower end portion, closing the lower end portion thereof from the hollow core portion thereof above. A plurality of openings 27 extend through the lower end of core 25 below closure member 30 so as to permit the flow of pebbles therethrough into pebble outlet conduit 17. Baffle member 22 is closed about the upper end of core 25, as shown in Figure 2. Such a joining of the core and baffle can also be used in connection with the device shown in Figure 1. Pebble outlet 17 may be in the form of a plurality of conduits extending from the annular chamber, if desired.

Referring particularly to the device shown in Figure 3 of the drawings, pebble heater chamber 28 comprises upright elongated shell 29 closed at its upper and lower ends by closure members 31 and 32, respectively. Pebble inlet conduit 33 extends into the upper end portion of chamber 28 and may be a single pebble inlet conduit centrally positioned as shown in Figure 3 or alternatively may comprise a plurality of inlet conduits distributed over the upper end portion of chamber 28. Gaseous effluent outlet conduit 34 extends upwardly from the upper end portion of chamber 28. Heating gas inlet means comprising inlet conduit 35 and header member 36 is connected to the lower end portion of chamber 28, preferably bottom closure member 32. Reactor chamber 11 comprising upright elongated shell 12 closed at its upper and lower ends by closure members 13 and 14, respectively, is positioned directly below chamber 28 and pebble conduit 15 is connected to the lower end of chamber 28 and to the upper end of chamber 11. Gaseous inlet conduit 37 is connected to throat 15 intermediate its ends, so as to provide for the introduction of an inert gas thereto thus providing means for preventing the flow of gaseous materials from one of the chambers to the other. Reaction material inlet conduit 18 is connected to the lower end portion of chamber 11 through header member 19. Gaseous effluent outlet conduit 16 extends upwardly from the upper end portion of chamber 11. Fluid inlet conduit 24 extends into the lower end portion of chamber 11 and extends upwardly through the central core, not shown, as discussed in connection with Figures 1 and 2 of the drawing. Pebble outlet conduit 17 extends downwardly from the lower end of chamber 11 and is connected to the upper end portion of pebble entraining chamber 38. Pebble entraining chamber 38 is closed about the lower end portion of elevator conduit 39 and is provided with a lift gas inlet conduit 41, which is preferably coaxially disposed with respect to the lower end of elevator conduit 39. Elevator conduit 39 extends upwardly into lower end portion of gas-pebble separator chamber 42. Gaseous effluent outlet conduit 43 extends from the upper end portion of chamber 42 and chamber 42 is connected at its lower end to the upper end portion of pebble inlet conduit 33.

In the operation of the devices shown in Figures 1, 2 and 3 of the drawings, pebbles are introduced into the upper end portion of pebble heater chamber 28 through pebble inlet conduit 33. The pebbles form a contiguous gravitating mass within that chamber and gravitate downwardly therethrough. Gaseous heating material is introduced into the lower end portion of chamber 28 through inlet conduit 35 and header member 36. The gaseous heating material may be a material that has been preheated externally of chamber 28 or may be a material which is burned in the lower end portion of chamber 28 in a gas distribution chamber, or may be burned on the surface of the pebbles within the chamber 28. In any case, the hot gaseous heat exchange material passes upwardly through the gravitating contiguous mass within that chamber, raising the pebbles to a desired temperature by direct heat exchange therewith. The gaseous effluent is removed from the upper end portion of chamber 28 through effluent outlet conduit 34. Pebbles which have been raised to the desired temperature within chamber 28 are gravitated from that chamber through pebble conduit 15 into the upper end portion of chamber 11.

The pebbles gravitating downwardly through conduit 15 into the upper end portion of chamber 11, are caused to pass over the surface of perforate baffle member 22 and to divide into an annular mass of pebbles around the baffle and around the central core formed within chamber 11. The pebbles form a contiguous gravitating mass within chamber 11 between core 21 or 25 and the shell 12. Reactant materials are introduced into the lower end portion of chamber 11 through inlet conduit 18 and header member 19. The reactant materials pass upwardly through the hot gravitating mass within that chamber being raised to reaction temperature in a direct heat exchange therewith. Resulting reaction products are removed from the upper end portion of the pebble mass in the upper end of chamber 11 and are removed from chamber 11 through gaseous effluent outlet conduit 16.

The pebbles cooled in the direct heat exchange with the reactant materials in chamber 11 are gravitated from the lower end portion of that chamber through pebble outlet conduit 17. Those pebbles are passed into pebble entraining chamber 38 wherein a stream of lift gas is introduced through the mass of pebbles so as to entrain the pebbles and carry them upwardly through elevated conduit 39 into gas-pebble separator chamber 42. In chamber 42, the velocity of the pebble flow lessens to such an extent that the pebbles are allowed to settle out of the gas stream, gravitating from the lower end of chamber 42 into chamber 28 through pebble inlet conduit 33. Gaseous effluent is removed from the upper end portion of gas-pebble separator chamber 42 to gaseous effluent outlet conduit 43.

Water or steam is introduced into the chamber 11 through conduit 24 or through conduit 26. In the device shown in Figure 1 of the drawings, it is preferred to introduce steam since conduit 24 is more insulated from the direct rays of heat carried by the gravitating pebbles than is a conduit within the walls of the central core. In the device shown in Figure 2, steam or water may be introduced through conduit 26 and the water is converted to steam during its passage upwardly through the walls of core 25 and that steam is introduced into the upper end portion of chamber 11. Steam which is introduced into the upper end portion of chamber 11 from core 21 or 25 passes upwardly through perforate baffle 22 and through the thin layer of pebbles formed thereon into and around the incoming column of hot pebbles. This steam passing through the hottest portion of the pebble mass, substantially prevents hydrocarbon gases from contacting those pebbles, thereby reducing the opportunity for those hydrocarbon gases to become overcracked and to deposit carbonaceous materials around the pebble inlet conduit and on the top end of the reactor chamber. After the steam has passed upwardly through the central mass of pebbles coming directly from the pebble inlet conduit, it passes across the top surface of the reactor chamber and is removed from that chamber through gaseous effluent outlet conduit 16.

Inasmuch as the major deposition of coke in the reactor chamber is formed around the pebble inlet conduit, the exclusion of hydrocarbon gases from that portion of the pebble mass materially reduces the coke deposition in the upper end portion of the reaction chamber.

Various modifications of this invention will be apparent to those skilled in the art upon study of the accompanying disclosure. Such modifications are believed to be clearly within the skill of the art and within the spirit and the scope of this disclosure.

I claim:

1. An improved reactor comprising a closed, upright, elongated shell; a pebble inlet conduit centrally disposed in the upper end of said shell; gaseous effluent outlet means in the upper end portion of said shell; pebble outlet means in the lower end of said shell; a core, coaxially disposed within said shell extending upwardly from the lower end of said shell and spaced below the upper end of said shell; gaseous material inlet means in the lower end portion of said shell and communicating with the lower end portion of the annular chamber formed between said shell and the said core; a baffle, perforate in its central portion, disposed coaxially with respect to said pebble inlet conduit and positioned so as to prevent pebble flow into said core; and an inert gas conduit means extending into said core and being open at the upper end of said core and below said perforate baffle.

2. The improved reactor of claim 1, wherein said perforate baffle is a conical baffle closed around the upper end of said core, extending upwardly to a point directly below said pebble inlet conduit and being perforate only in its upper end portion.

3. The improved reactor of claim 2, wherein said pebble outlet means is a single outlet pebble conduit centrally disposed in the lower end of said shell; and pebble outlet conduits extend through the wall of said core so as to provide communication between the annular chamber formed between said shell and said core and said pebble outlet conduit means.

4. The improved reactor of claim 2, wherein said inert gas conduit means extends upwardly from the lower end portion of said core through the wall of that core to the upper end portion thereof and opens into the interior of said core.

5. The improved reactor of claim 1, wherein said inert gas conduit means extends upwardly from the lower end portion of said shell through the interior of said core to the upper end portion thereof.

6. An improved reactor comprising a closed, upright, elongated shell; a pebble inlet conduit disposed in the upper end of said shell; gaseous effluent outlet means in the upper end portion of said shell; pebble outlet means in the lower end of said shell; reactant material inlet means in the lower end of said shell; and an inert gas conduit means extending into said shell immediately below said pebble inlet conduit.

References Cited in the file of this patent

UNITED STATES PATENTS

| Number | Name | Date |
| --- | --- | --- |
| 2,576,058 | Weber | Nov. 20, 1951 |
| 2,593,345 | Robinson | Apr. 15, 1952 |